United States Patent [19]

Shulman

[11] Patent Number: 4,682,035
[45] Date of Patent: Jul. 21, 1987

[54] SOLID STATE COUNTING SYSTEM FOR HIGH ENERGY BETA AND GAMMA DECAY ISOTOPES

[75] Inventor: Seth D. Shulman, Washington, D.C.

[73] Assignee: Bioscan, Inc., Washington, D.C.

[21] Appl. No.: 726,247

[22] Filed: Apr. 23, 1985

[51] Int. Cl.$^4$ .............................................. G01T 1/24
[52] U.S. Cl. .................................. 250/370; 250/328
[58] Field of Search ................... 250/491.1, 388, 364, 250/392, 328, 370 K, 370 R

[56] References Cited

U.S. PATENT DOCUMENTS

| 3,988,587 | 10/1976 | Shreve, Jr. et al. | 250/364 |
| 4,348,588 | 9/1982 | Yrjönen et al. | 250/252.1 |
| 4,536,841 | 8/1985 | Waechter et al. | 364/414 |

FOREIGN PATENT DOCUMENTS

| 2014340 | 10/1971 | Fed. Rep. of Germany | 250/370 R |
| 7125292 | 2/1973 | France | 250/370 K |

Primary Examiner—Janice A. Howell
Assistant Examiner—Constantine Hannaher
Attorney, Agent, or Firm—Burns, Doane, Swecker & Mathis

[57] ABSTRACT

The disclosure relates to a method and apparatus for quantitatively evaluating radiation emissions of radiolabeled laboratory samples. These radiation emissions frequently include high energy beta and gamma radiation emissions resulting from $^{32}P$ isotope decay. High energy beta and gamma radiation is detected by a solid state PIN photodiode and analyzed by a microprocessor to provide an indication of a radiation emission characteristic such as activity expressed in disintegrations per minute (DPM). An indication of sample activity is obtained from a detected sample count rate adjusted by a detector calibration constant which is determined by the microprocessor from a reference radiation emitting sample of known activity and volume. Indications of radiation emission characteristics may be displayed by an alpha-numeric liquid crystal display. Hard copy data may be produced from an expansion module in the form of a printer module adapted to receive data input from the microprocessor. Another expansion module, a high performance liquid chromatography (HPLC) flow detector, provides indications of radiation emissions of a sample flow passing through the flow detector. Radiation emission characteristics obtained from the sample flow may be printed by the printer module or displayed by the alpha-numeric liquid crystal display.

46 Claims, 8 Drawing Figures

SOLID STATE COUNTING SYSTEM FOR HIGH ENERGY BETA AND GAMMA DECAY ISOTOPES

BACKGROUND OF THE INVENTION

This invention relates generally to the measurement of radioactivity of a sample in a container and, more particularly, to a new and improved electronic method and apparatus for quantitatively measuring the radioactivity of an individual sample in a laboratory environment.

In the biological and medical sciences, certain radioisotopes are frequently used as tracers in tests and experiments in order to detect minute quantities of certain biochemicals present in test samples. For example, the radioisotope $^{32}P$ is commonly used by researchers in these fields to label genetic material (DNA/RNA) and proteins. Frequently, it is required to know the precise amount of a radioisotope contained in various test samples. Quantitative measurements of the amount of radioactive material present in a test sample usually are expressed as an activity in disintegrations per minute. These measurements provide valuable information both in preparing the radio-labelled chemicals and in measuring an amount of radio-labelled material recovered from a system under investigation. Measurements of the activity of a sample also are needed to insure the safety of personnel handling the radioisotopes.

At the present time, most measurements of activity are obtained from either scintillation counting or from Geiger counting. Scintillation counting uses photomultiplier tubes to detect photons produced in a scintillation medium in response to absorption by the medium of beta and gamma radiation. Many of the photons emitted from the scintillation medium are incident upon a photocathode of a multiplier phototube. These photons are converted to photoelectrons and are multiplied in number at a succession of phototube electrodes, called dynodes, the output of which is a measurable electrical pulse related to the incident radiation.

Liquid scintillation counting operates on the same basic principle as scintillation counting, except that the scintillation medium is a liquid into which is dissolved, suspended or otherwise intermixed the radioactive sample being tested. Radioactive emissions of a sample are measured by collecting photons emitted from the scintillation medium and generating photoelectrons responsive thereto to produce electrical pulses related to the incident beta and gamma radiation.

Scintillation and liquid scintillation counting require special sample preparation and the use of special sample containing vials in order to provide a quantitative measure of the amount of radioactive material present in a particular sample. Accordingly, an extra material handling step, involving a transfer of radioactive material into one of the special vials, is required when using these techniques. This transfer step is undesirable, for it is accompanied by an element of error in the measurement of material transferred to the vials. When this measurement error is added to the error inherent to the particular experiment or test technique being utilized, further uncertainty as to the accuracy of the quantitative data obtained from the sample results. Furthermore, the preparation of even a small amount of material for scintillation counting results in the loss of that material for further experimentation. In many cases, where only a very limited quantity of material is available, this loss may be unacceptable.

Several manufacturers produce sophisticated instruments for both beta and gamma radiation counting. Generally, these instruments are designed to count large numbers of radioactive samples in an automated mode. These instruments generally include many features such as multiple sample carriers capable of holding hundreds of individual samples, multi-user protocols for automatically altering data manipulation from one set of samples to the next, and advanced calibration and correction techniques for obtaining more accurate quantitative data. Needless to say, such devices are complex and expensive.

Geiger counters are generally used when counting small numbers of samples. These counters provide a simpler but much less reliable means for measuring an approximate activity of a radiation emitting sample. Geiger counters use gas filled tubes the contents of which are ionized by incident radiation to produce an electronic signal which registers on a meter or in an audio circuit. The magnitude of the electronic signal is proportional to the amount of radiation impinging upon the gas filled tubes. Commercial Geiger counters are generally hand held devices whose quantitative accuracy is limited by uncertainties in the geometrical positioning of the sample relative to the detector and the absence of careful calibration techniques. However, the instruments are very useful in determining the presence and/or location of radioactivity and in determining an approximate activity of the sample for safe handling considerations. Geiger counters are also helpful in assessing the progress of certain chemical reactions or experiments.

In most laboratories, and in most biotechnology laboratories in particular, the choice of radioactivity counting instrumentation is governed by the number of samples to be counted, the required accuracy of the results, the amount of sample availabe for analysis, and the availability of the instruments. Geiger counters are available in almost all laboratories which handle radioisotopes as a safety precaution for monitoring spilled or airborne radioactive materials. As a result, quick, approximate determinations at the laboratory bench are generally made using Geiger counters despite the limited degree of measurement accuracy they provide.

Scintillation or liquid scintillation counters are available in most laboratories only on a shared basis. Because of their relative size and cost, these instruments are generally located in one area which may be some distance from a researcher's workbench. Therefore, these instruments tend to be used only when a substantial number of samples have been accumulated for counting. Samples are generally loaded into an available test tube rack of an automatic sample handler, desired counting parameters are selected, and the samples are left in the counting machine to be counted in turn. Data obtained from the radiation counting is generally recorded by a printing device. The actual counting may occur many hours following the insertion of the samples into the machine and often the results are not available until the following day. While it is possible to count one or several samples in a scintillation or liquid scintillation counter, to do so is a tedious procedure which is infrequently undertaken. In order to count small numbers of samples, the current automatic sequence of the counting device must be interrupted, the samples inserted and counted, and then the instrument returned to the correct position in the automatic counting sequence. Errors in material handling and machine operation may result in lost counting time causing delays of many hours in obtaining the data from the automated runs with larger numbers of samples.

OBJECTS AND BRIEF SUMMARY OF THE INVENTION

In view of the foregoing, it is an object of the invention to provide an improved, relatively simple and inexpensive radiation detection method and apparatus for quantitative analysis of radioactive samples in a laboratory environment.

It is another object of the invention to provide an improved radiation detection method and apparatus for detecting high energy beta and gamma emissions.

It is still another object to provide an improved radiation detection method and apparatus for providing calibrated quantitative data.

Yet another object is to provide an improved radiation detection method and apparatus which provides accurate and reproducible sample positioning geometry.

Yet still another object of the invention is to provide an improved radiation detection method and apparatus adapted for electronic and program expansion.

Still yet another object of the invention is to provide an improved radiation detection method and apparatus which requires no special sample preparation or handling.

A further object of the invention is to provide an improved radiation detection method and apparatus which leaves a measured sample intact and unchanged for further use.

The foregoing and further objects and advantages are provided in accordance with the present invention through the provision of a novel method and related apparatus for quantitatively measuring the activity of a sample containing radioactive material. Being relatively simple to use and inexpensive to produce, the present invention provides a laboratory tool which can be made available to individual researchers to permit them to analyze radioactive samples accurately and rapidly.

The method of the invention includes the steps of detecting radiation emitted from a sample of known activity and volume and generating responsive thereto a first radiation emission characteristic, comparing the first radiation emission characteristic with the known activity for the sample and generating a calibration constant for the test procedure, detecting radiation emitted by an unknown radiation emitting sample of known volume and generating a radiation emission characteristic thereto, comparing the radiation emission characteristic for the unknown sample with the calibration constant to obtain a corrected radiation emission characteristic indicative of a quantitative measure of the activity of the unknown radiation emitting sample, and displaying the corrected measure of activity obtained for the unknown sample. No special preparation or processing of the sample, such as combining it with liquid or other material or drying it on a special substrate, is required. Therefore, no portion of the sample is consumed or destroyed during the course of radiation emissions detection.

The novel apparatus of the invention pertains to an inexpensive, compact, bench-top radiation detection apparatus having a sample receiving zone formed in a sample holder for receiving a single sample containing radioactive material. A detector of radiation positioned near the sample receiving zone produces a signal representative of a radiation emission characteristic for a sample of radiation emitting material. The radiation emission characteristic is analyzed and selectively compared to at least one value stored in an addressable memory (e.g., a random access memory or RAM) of an electronic processing circuit.

The processing circuit includes a microprocessor having pre-programmed data processing information stored in a memory (e.g., a read only memory or ROM) for processing radiation emission data obtained from the radiation detector. The processing circuit communicates with a data input means in the form of a digital keyboard through which data may be entered and stored in the addressable memory. Selection of an appropriate command from the data input means provides for display of a radiation emission characteristic by an alpha-numeric liquid crystal display (LCD) positioned adjacent the data input means.

In a preferred form of the invention, an inner surface of the sample receiving zone cooperates with an external surface of a sample vial inserted into the sample receiving zone to support the sample vial and to provide optimum sample-detector geometry. Sample-Detector geometry is important in order to ensure sample-to-sample reproductibility of a particular radiation emission cross section from which radiation emissions are detected by the detector.

A PIN photodiode is used as a radiation detector. PIN photodiodes exhibit rapid response to high speed pulsed radiation and provide a large sensitive area for beta and gamma radiation emissions. A PIN photodiode is selected which is responsive to high energy ($\sim 1$ MeV) beta and ($\sim 100$ KeV) gamma radiation emissions. Radiation emissions of this energy level accompany decay of $^{32}P$ and other high energy isotopes used in biological and medical research.

An electrical connector located along a back end of the apparatus may be provided for communication between the microprocessor and at least one of a family of expansion modules. These expansion modules may augment or re-define a function of certain components of the apparatus. When additional ROM beyond that provided internally for the microprocessor (FIG. 6) is required for operation of a particular expansion module, program control of the microprocessor is directed by the expansion module. When the expansion module directs operation of the microprocessor, the module may assume control of the data input means and re-define various aspects of its functions.

The family of expansion modules includes a high performance liquid chromatography (HPLC) flow detector and a printer. The HPLC flow detector includes a flow cell, radiation detector, analog circuitry, and an additional microprocessor program stored in a ROM. The microprocessor, data input and data display means are used from the radiation detection apparatus. The ROM of the expansion module directs operation of the microprocessor to obtain quantitative data concerning radiation emissions of a sample passing through the flow detector.

The printer module includes an inexpensive dot matrix thermal printer. Selection of an appropriate printer command and data transmission rate directs the printer to provide hard copy of output data from the radiation detection apparatus. Information such as the date and time of data analysis may be communicated to the printer through the data input means of the apparatus and included in the hard copy of the data.

BRIEF DESCRIPTION OF THE DRAWINGS

The foregoing and other objects and advantages of the present invention will become apparent from the detailed description that follows when read in conjunction with the drawings in which.

DETAILED DESCRIPTION OF THE PREFERRED EMBODIMENT

Figure 1:
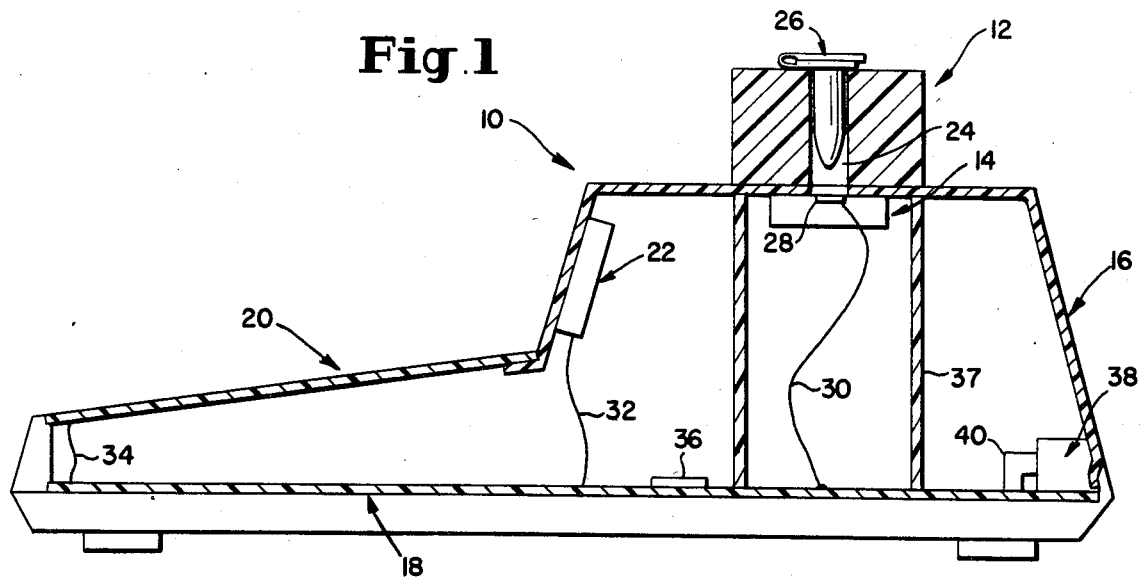
FIG. 1 is a sectional view of a radiation detection apparatus in accordance with the present invention.

A preferred embodiment of a radioactivity measurement machine for laboratory analysis of individual samples is illustrated in its various aspects in FIGS. 1 to 8. Referring now to FIG. 1, there is depicted a radiation measuring apparatus designated generally at 10 having a sample holder 12, a detector subassembly 14, a housing 16, a main printed circuit board 18, a data input device 20, and a data display 22. The sample holder 12 defines a sample receiving zone 24 for receiving a sample vial 26. The sample receiving zone 24 cooperates with the sample vial 26 in a manner detailed below to position the sample vial in a desired spatial relationship with a radiation detector 28 positioned within the detector subassembly 14.

The detector subassembly 14, data input device 20, and data display 22 communicate with the main printed circuit board 18 in a conventional manner, as by ribbon cables 30, 32, and 34, respectively. Radiation emitted by a sample contained in a vial positioned in the sample holder 12 impinges upon the radiation detector 28 which generates a signal responsive thereto. Signals produced by the detector 28 are analyzed by a microprocessor 36 which is connected to the main printed circuit board. The detector 28 is shielded from environmental radiation by a radio-frequency conductive radiation shield 37. If this shield is formed from any suitable beta and gamma radiation shielding material of suitable thickness, it will also shield the user from the radiation emitted by the sample. Commands entered through the data input device 20 direct operation of the microprocessor 36. Any suitable input device for entering information may function as the data input keyboard 20.

Information processed by the microprocessor 36 may be displayed by the data display 22, which may be any conventional display means, such as an alpha-numeric LCD or CRT. An electrical connector 38 located at a back end of the apparatus 10 communicates with the microprocessor 36 and main printed circuit board 18 in a conventional manner, as by cables 40, to permit coupling of the apparatus to one or more of a family of expansion modules (not depicted). The family of expansion modules may include, for example, a printer module and a high performance liquid chromatography (HPLC) flow detector. The printer module provides hard copy of data obtained from test samples. The HPLC flow detector provides data regarding a sample flow. Hard copy of data obtained from the HPLC flow detector may be obtained from the printer module.

Figure 2:
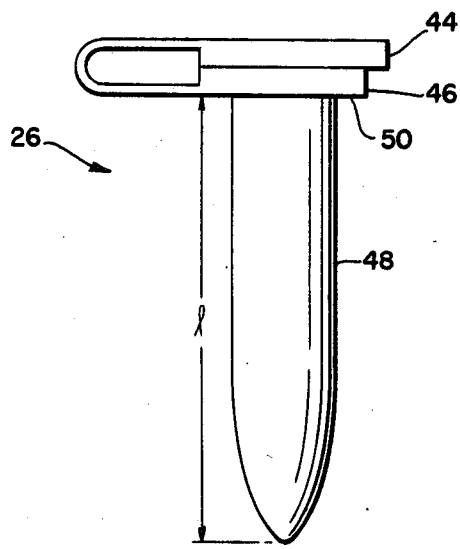
FIG. 2 is a side elevational view of a sample container for use with a radiation detection apparatus in accordance with the present invention.
Figure 3:
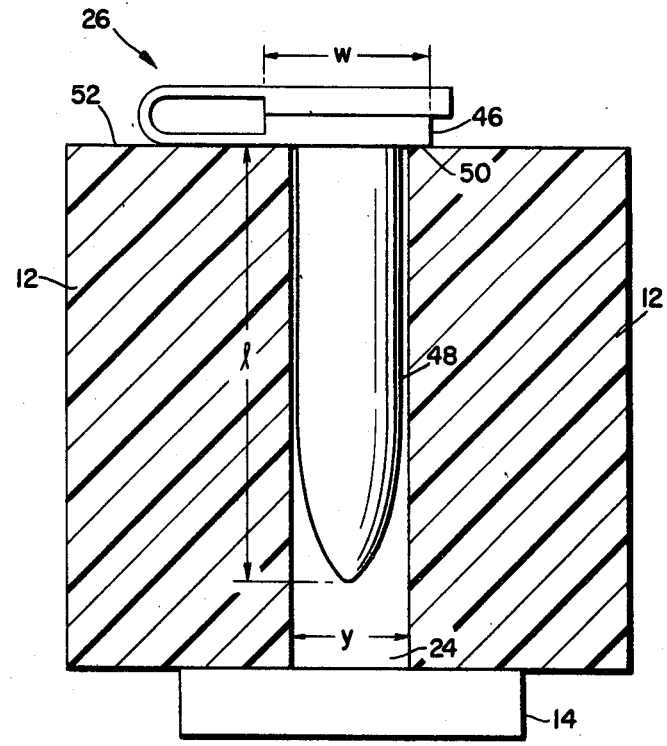
FIG. 3 is a sectional view of a sample container vial positioned in a sample receiving zone of a radiation detection apparatus.

The sample holder 12 of FIG. 1 is shown in greater detail in relation to a sample vial in FIGS. 2 and 3 to illustrate the cooperative relationship between the sample vial 26 and the sample holder 12. With reference to FIGS. 2 and 3, a sample receiving zone 24 receives a sample of radiation emitting material contained in a sample vial 26 (FIG. 2). The sample requires no special sample preparation or handling, and remains intact for further use. The sample vial 26 is manually inserted into the sample receiving zone 24 of the sample holder 12 for quantitatively measuring radiation emitted by the sample contained in the vial. As is shown in FIGS. 2 and 3, the vial 26 includes a removable cap 44 and a base 46 having a sample receiving tube 48 of length l extending therefrom. The base 46 is characterized by a width w which exceeds a width y of the sample receiving zone 24, as shown in FIG. 3. Accordingly, when the vial 26 is placed within the sample receiving zone, only the tube 48 of the vial passes into the receiving zone. A lower surface 50 of the base 46 is caught and supported by an upper surface 52 of the sample holder 12, which upper surface prevents the cap and base portions of the vial from passing into the sample receiving zone.

Figure 4:
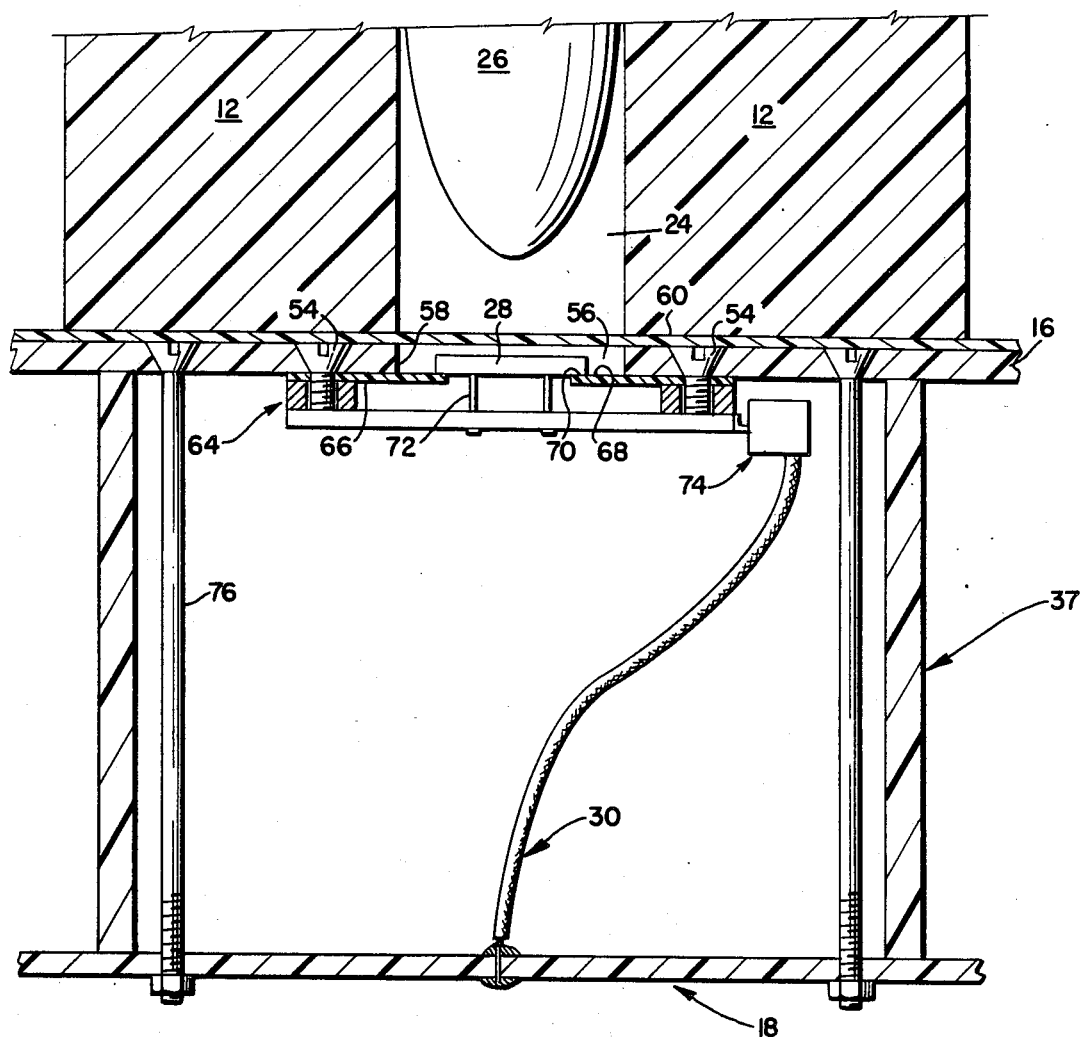
FIG. 4 is a sectional view of a detector subassembly.

FIG. 4 illustrates in greater detail the detector subassembly 14 of FIG. 1 and depicts its spatial relationship with the sample receiving zone. As is shown in FIG. 4, the detector subassembly 14 is positioned beneath the sample holder 12 and includes the radiation detector 28 for detecting radiation emitted by a sample positioned in the sample receiving zone 24. The sample is contained in the receiving tube 48 of the vial 26, which receiving tube projects into the sample receiving zone a distance l corresponding to a characteristic tube length, as depicted in FIGS. 2 and 3. Accordingly, a sample placed in the sample receiving zone will be spaced from the detector an essentially fixed distance, resulting in an essentially fixed sample-detector geometry which is reproducible on a sample-to-sample basis.

The detector 28 may include a PIN photodiode for detecting high-speed pulsed radiation. PIN photodiodes exhibit a large sensitive area and a high-speed response to incident radiation. Once a minimum energy threshold for incident radiation is attained, the photodiode detector 28 produces an electrical pulse related to the radiation incident to the photodiode. A PIN photodiode is selected which is responsive to high energy ($\sim 1$ MeV) beta and ($\sim 100$ keV) gamma radiation emissions. Radiation emissions of this energy level accompany decay of $^{32}P$ and other high energy isotopes used in biological and medical research.

As is depicted in FIG. 4, the detector subassembly 14 is secured to the housing 16 of the apparatus in a conventional manner, as by screws 54. The detector 28 is positioned in a channel 56 formed between ends 58 of the housing 16 beneath the sample holder 12. An aluminized plastic membrane 60 interposed between the detector sub-assembly 14 and the sample holder 12 protects the detector 28 from sample spillage. The screws 54 position a printed circuit board 62 beneath the detector 28. A spacer 64 and a washer 66 surrounding each screw separates and insulates the housing 16 from the printed circuit board 62. An inwardly directed end 68 of each washer 66 extends under a lower surface 70 of the photodiode detector 28 in order to support the detector in the channel 56 above the circuit board 62. The detector 28 is electrically coupled to the circuit board 62 by conductive pins 72 extending from the lower surface 70 of the photodiode detector 28. Electrical signals produced by the detector pass through the conductive pins 72, into the printed circuit board 62 where the signals are amplified, processed, and transmitted to an electrical connector 74 positioned adjacent the detector subassembly 14. The electrical signals pass from the electrical connector 74 to the main printed circuit board 18 through the ribbon cable 30, as discussed above. Ultimately, those detector signals provide data to the microprocessor 36 on the main printed circuit board 18 to permit the determination of radiation characteristics of the sample as is described hereinafter.

Surrounding the detector subassembly 14 is the radiation shield 37. The radiation shield isolates the detector 28 from environmental radiofrequency radiation emitted by the unit itself and by a surrounding laboratory environment. Positioned adjacent the radiation shield 37 are support struts 76 which support the housing 16 above the printed circuit board 18. These support struts are conventional in design and may include a threaded screw and nut arrangement as depicted in FIG. 2.

Figure 5:
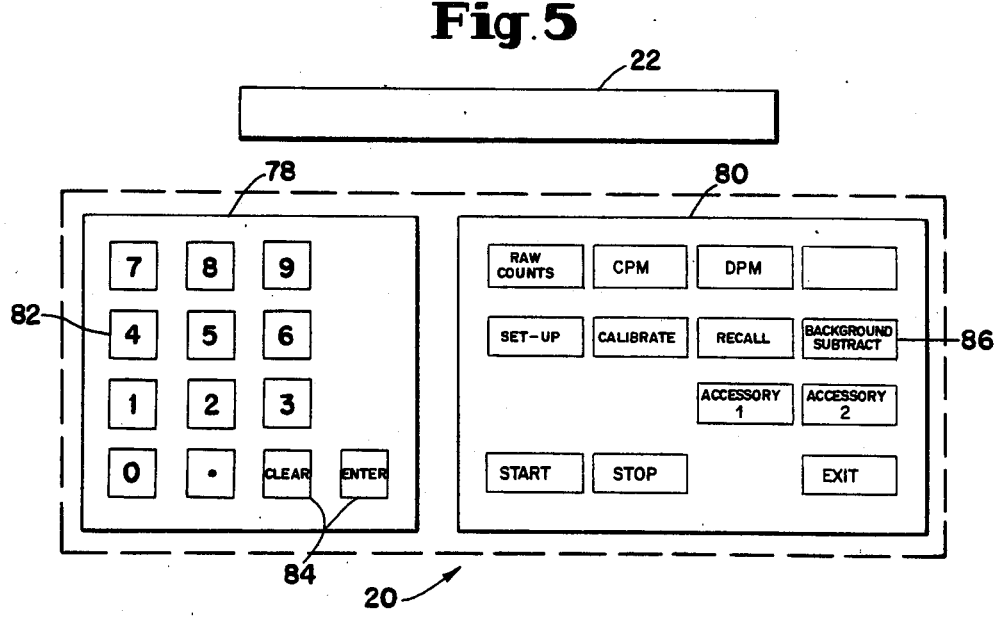
FIG. 5 is an overhead view of data input and data display means.

FIG. 5 illustrates a preferred embodiment of the data input device 20. The input device may be any conventional data input means such as a keyboard. As shown in FIG. 5, the preferred keyboard arrangement includes two major work areas: a digital keypad 78 and a program command center 80. The digital keypad 78 includes a plurality of numeric keys 82 for inputing numeric data to the microprocessor 36. Data keyed through the digital keypad 78 is displayed by the data display 22 positioned adjacent the keyboard. The data display may include any conventional data display means, such as an alpha-numeric LCD. The displayed data may be stored temporarily, e.g. in a register, and entered into the microprocessor when an appropriate functional key 84 such as the key designated "enter" is depressed. Errors in numeric data may be corrected prior to entry into the microprocessor by depressing an appropriate functional key 84 of the digital keypad 78 such as the key labelled "clear".

The program command center 80 preferably includes a plurality of program command keys 86 for directing program control of microprocessor functions. These functions include detector calibration and quantitative measurement of radiation emitted by a test sample expressed in counts per minute (CPM) and disintegrations per minute (DPM).

Figure 6:
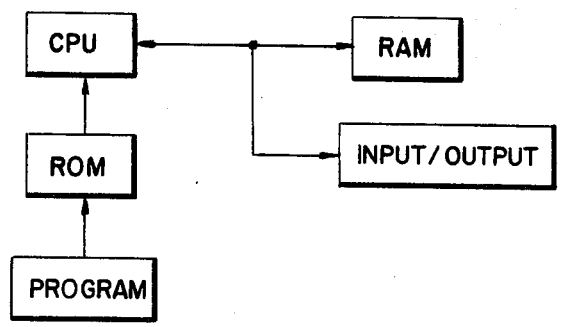
FIGS. 6 and 7 are block diagrams illustrating operational steps of one embodiment of the invention.
Figure 7:
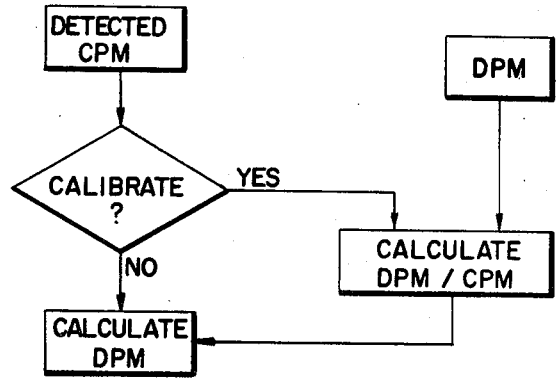
Figure 8:
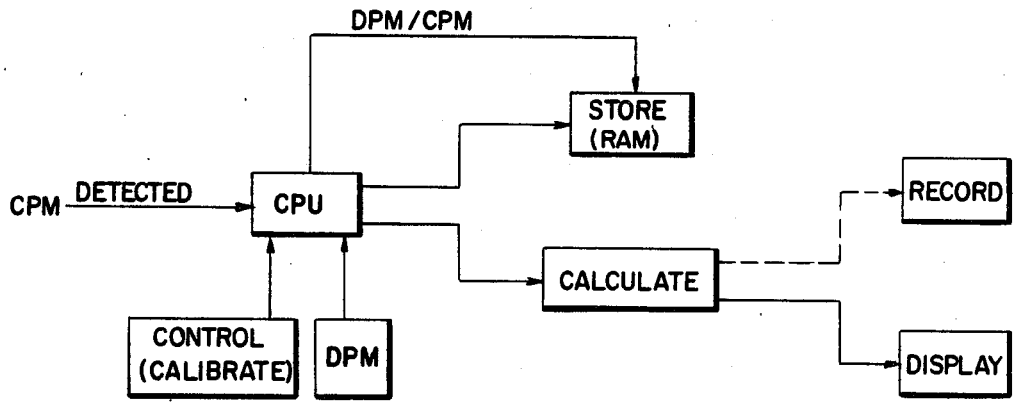
FIG. 8 is a block diagram illustrating a second embodiment of the invention.

FIGS. 6 to 8 functionally illustrate the microprocessor 36 and its operation. As shown in FIG. 6, the microprocessor comprises a CPU with associated random access memory (RAM) and read only memory (ROM) in a conventional arrangement. The CPU communicates with the data input/output devices (e.g. the keyboard and the display) in a conventional manner and the ROM containing the program is sequenced through its program steps in the usual manner.

As is illustrated in FIG. 7, a preselected radiation emission characteristic of a known sample is determined as a calibration value for subsequent evaluation of an unknown sample. Detector calibration is accomplished by inserting a sample vial 26 containing a reference sample of known activity and volume into the sample receiving zone 24 of the sample holder 12. The activity of the reference sample, expressed in disintegrations per minute (DPM) is entered into the random access memory (RAM) of the microprocessor 36 for subsequent recall, as illustrated in FIG. 6. The activity of the reference sample is determined and stored in the RAM as a measure in CPM. The microprocessor then computes a calibration value C as follows:

$$C = DPM/CPM$$

The calibration value is stored in the RAM for use in further evaluation of unknown samples. In particular, the value C is used to correct quantitative radiation emission data obtained from radiation-emitting samples.

Once the detector 28 has been calibrated, quantitative radiation emission data may be obtained from radiation emitting samples of unknown activity. A quantity of an unknown sample, x, substantially identical to that of the reference sample is collected in a vial 26 and counted by the detector 28. Data obtained from the unknown sample is usually expressed in counts per minute. An indication of sample activity, DPMx, is obtained using the stored calibration value C as follows:

$$DPMx = (C) \times (CPMx)$$

where CPMx is a measure in counts per minute of radiation emissions from an unknown sample, x.

CPMx may be obtained from one of two methods. In a first method, the user may specify a total number of counts to be accumulated by the detector corresponding to a desired statistical precision. This total number of counts is entered into the RAM through the numeric keys 82 of the digital keypad 78 and an appropriate program command key 86. When the selected number of counts is attained (or after a maximum counting time has elapsed if the total number of counts has not been reached), the microprocessor 36 terminates detector counting, notes the total elapsed counting time, and computes CPMx as follows:
$$CPMx = CTSx/T$$

where CTSx represents the total number of counts recorded and T represents the total time elapsed to obtain CTSx.

Alternatively, CPMx may be obtained by counting radiation emissions for a pre-determined time. The appropriate program and time parameters are entered into the microprocessor 36 as above. Following expiration of this selected time period, the microprocessor registers the total number of counts and computes the value of CPMx as follows:
$$CPMx = (Total\ Counts)/(Count\ Time)$$

Once CPMx has been determined from any of the above-discussed methods, the activity for the unknown sample (DPMx) may be obtained from the calibration value C as follows:

$$DPMx = (C) \times (CPMx)$$

The determination of DPMx is obtained from selecting an appropriate program command key 86 of the program command center.

Radiation emission characteristics expressed in CPM or DPM may be displayed by the data display 22, which may include an alpha-numeric LCD positioned adjacent to the data input device 20, as shown in FIG. 5. The data display 22 receives signal input from the microprocesor 36 and the data input device 20 to provide an indication of a particular radiation emission characteristic for a sample of radiation-emitting material.

In addition to the foregoing, radiation emissions may be evaluated and displayed by a family of expansion modules adapted to communicate with the radiation measuring apparatus 10. Communication between an expansion module and the apparatus is provided by the electrical connector 38 located at a back end of the apparatus. The electrical connector 38 includes a microprocessor bus and communicates with the microprocessor 36 through the connector cables 40 which carry signal input between the electrical connector 38 and the microprocessor 36. Signal input may include data and program control information. When additional ROM from an expansion module is connected to the connector 38, program control of the microprocessor may be directed by the expansion module. In the absence of additional ROM from an expansion module, program control of microprocessor functions is directed by a ROM associated with the microprocessor, as depicted in FIG. 6.

The family of expansion modules may include a high performance liquid chromatography (HPLC) flow detector and a printer. The HPLC flow detector includes a conventional flow cell, radiation detector and analog circuitry. The detector may also be provided with an additional ROM. The flow detector accommodates radiation emitting samples in which radiation emissions may vary as a function of time. Data obtained from flowing samples is supplied to and processed by the microprocessor 36 via the connector 38, and the results may be displayed by the data display 22 unless otherwise directed by the program command center 80.

The printer module includes a printing means such as an inexpensive dot matrix thermal printer for providing hard copy of data obtained from a measured sample through a communication port such as an RS232 port which receives signal input from the microprocessor 36. Dip switches associated with the printer module provide for selection of an appropriate data transmission rate from the microprocessor 36. Hard copy of data obtained from either the detector 28 or the HPLC flow detector may be printed by the printer module.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A portable, bench top radiation detection apparatus for quantitative analysis of radioactive samples comprising:
    a sample holder having an opening defining an interior sample receiving zone for receiving a container containing a single radiation-emitting sample;
    a generally planar, solid state radiation detector positioned adjacent said sample holder at one end of the sample receiving zone for detecting radiation emitted by said radiation-emitting sample;
    signal analyzing means responsive to said radiation detector for quantitatively analyzing radiation emitted by said radiation-emitting sample, said signal analyzing means including means for storing a value related to a pre-selected radiation emissing characteristic of a known radiation-emitting sample positioned in said sample receiving zone, and means responsive to said stored value for analyzing radiation emissions from a different sample placed in said sample receiving zone; and
    means for displaying a radiation emission characteristic for said different radiation-emitting sample.

2. The portable, bench top radiation detector for quantitative analysis of radiation-emitting samples of claim 1, wherein said radiation detector is a solid state diode.

3. The portable, bench top radiation detector for quantitative analysis of radiation-emitting samples of claim 2, wherein said radiation detector is a solid state PIN photodiode.

4. The portable, bench top radiation detector for quantitative analysis of radiation-emitting samples of claim 1, wherein said sample container cooperates with said sample holder to provide an essentially fixed sample-detector spatial relationship.

5. The portable, bench top radiation detector for quantitative analysis of radiation-emitting samples of claim 1, wherein said apparatus includes connection means providing communication with at least one expansion module comprising an additional circuit board and electrical and mechanical parts for altering the functional capability of said radiation detector.

6. The portable, bench top radiation detector for quantitative analysis of radiation-emitting samples of claim 5, wherein said at least one expansion module includes means for communicating with at least one other expansion module.

7. The portable, bench top radiation detector for quantitative analysis of radiation-emitting samples of claim 1, wherein said means for displaying is a digital display means.

8. The portable, bench top radiation detector for quantitative analysis of radiation-emitting samples of claim 1, wherein said means for displaying is an alphanumeric liquid crystal display.

9. The portable, bench top radiation detector for quantitative analysis of radiation-emitting samples of claim 1, wherein said signal analyzing means includes a data input keyboard.

10. The portable, bench top radiation detector for quantitative analysis of radiation-emitting samples of claim 1, wherein said pre-selected radiation emission characteristic represents a radiation activity value expressed in disintegrations per minute (DPM) for said known radiation-emitting sample.

11. The portable, bench top radiation detector for quantitative analysis of radiation-emitting samples of claim 1, wherein said pre-selected radiation emission characteristic represents a calibration factor C relating a known radiation emission characteristic measured in disintegrations per minute (DPM) to a detected radiation emission characteristic expressed in counts per minute (CPM) for said known radiation emitting sample in accordance with the expression:

$$DPM = C \times CPM.$$

12. The portable, bench top radiation detector for quantitative analysis of radiation-emitting samples of claim 1, wherein said radiation detector is responsive to high energy beta and gamma radiation emissions.

13. The portable, bench top radiation detector for quantitative analysis of radiation-emitting samples of claim 1, wherein said radiation detector is responsive to $^{32}$P isotope decay emissions.

14. A method for quantitatively analyzing radiation-emitting samples in a portable, bench top radiation detection apparatus comprising the steps of:
  inserting a first container containing a known radiation-emitting sample into a sample receiving zone of a radiation detection apparatus;
  detecting radiation emitted by said known radiation-emitting sample into said sample receiving zone with generally planar detector and generating a signal responsive to said detected radiation;
  quantitatively analyzing said detected radiation with respect to a pre-selected radiation emission characteristic stored in a memory means;
  removing said first container and inserting into said sample receiving zone a second container containing a second radiation-emitting sample;
  detecting radiation emitted by said second radiation-emitting sample into said sample receiving zone and generating a second signal responsive to said detected radiation;
  quantitatively analyzing said radiation emitted by said second radiation-emitting sample with respect to said preselected radiation emission characteristic; and
  displaying a radiation emission characteristic for said second sample.

15. The method for quantitatively analyzing radiation-emitting samples in a portable, bench top radiation detection apparatus of claim 14, wherein each of said first and second containers is positioned relative to said planar detector of radiation so as to obtain an essentially fixed sample-detector spatial relationship.

16. A method for quantitatively analyzing radiation-emitting samples in a portable, bench top radiation detection apparatus of claim 15, wherein said radiation detector is a solid state diode detector.

17. The method for quantitatively analyzing radiation-emitting samples in a portable, bench top radiation detection apparatus of claim 15, wherein said radiation detector is a solid state PIN photodiode.

18. The method for quantitatively analyzing radiation-emitting samples in a portable, bench top radiation detection apparatus of claim 14, wherein said detected radiation comprises high energy beta and gamma radiation.

19. The method for quantitatively analyzing radiation-emitting samples in a portable, bench top radiation detection apparatus of claim 14, wherein said detected radiation comprises $^{32}$P isotope emissions.

20. The method for quantitatively analyzing radiation-emitting samples in a portable, bench top radiation detection apparatus of claim 14, wherein said pre-selected radiation emission characteristic is communicated to said memory means by a data input keyboard.

21. The method for quantitatively analyzing radiation-emitting samples in a portable, bench top radiation detection apparatus of claim 14, wherein said pre-selected radiation emission characteristic is an indication of activity of said known radiation emitting sample expressed in disintegrations per minute (DPM).

22. The method for quantitatively analyzing radiation-emitting samples in a portable, bench top radiation detection apparatus of claim 14, wherein one of said at least one preselected radiation emission characteristics is a calibration constant C relating a known radiation emission characteristic expressed in disintegrations per minute (DPM) to a detected radiation emission characteristic expressed in counts per minute (CPM) for said known sample in accordance with the expression $$DPM = C \times CPM.$$

23. The method for quantitatively analyzing radiation-emitting samples in a portable, bench top radiation detection apparatus of claim 14, wherein an alphanumeric liquid crystal display is used for displaying said radiation emission characteristic.

24. A method for quantitatively analyzing radiation-emitting samples in a portable, bench top radiation detection apparatus comprising the steps of:
  inserting a first container containing a known radiation-emitting sample into a sample receiving zone of a radiation detection apparatus to position said first container relative to a planar detector of radiation so as to obtain an essentially fixed sample-detector spatial relationship;
  detecting radiation emitted by said known radiation-emitting sample and generating a signal responsive to said detected radiation;
  quantitatively analyzing said radiation emitted by said known radiation-emitting sample with respect to at least one preselected radiation emisson characteristic stored in a memory means;
  removing said first container and inserting into said sample receiving zone a second container containing a second radiation-emitting sample and positioning said second container so as to obtain the essentially fixed sample-detector spatial relationship;
  detecting radiation emitted by said second radiation-emitting sample and generating a second signal responsive to said detected radiation;
  quantitatively analyzing said radiation emitted by said second radiation-emitting sample with respect to said at least one pre-selected radiation emission characteristic; and
  displaying a radiation emission characteristic for said second radiation-emitting sample.

25. The method for quantitatively analyzing radiation-emitting samples in a portable, bench top radiation detection apparatus of claim 24, wherein said detected radiation comprises high energy beta and gamma radiation.

26. The method for quantitatively analyzing radiation-emitting samples in a portable, bench top radiation detection apparatus of claim 24, wherein said detector of radiation is a solid state diode detector.

27. The method for quantitatively analyzing radiation-emitting samples in a portable, bench top radiation detection apparatus of claim 24, wherein said pre-selected radiation emission characteristic is communicated to said memory means by a data input keyboard.

28. The method for quantitatively analyzing radiation-emitting samples in a portable, bench top radiation detection apparatus of claim 24, wherein one of said pre-selected radiation emission characteristics is a calibration constant C relating a known radiation emission characteristic expressed in disintegrations per minute (DPM) to a detected measurement expressed in counts per minute (CPM) for said known sample in accordance with he expression:

$$DPM = C \times CPM.$$

29. A portable, bench top radiation detection apparatus for quantitative analysis of radiation-emitting samples comprising:
  a sample holder having an opening defining an interior sample receiving zone for receiving a container containing a single radiation-emitting sample;
  a generally planar radiation detector positioned adjacent said sample holder along only a portion of said sample receiving zone for detecting radiation emitted by said radiation-emitting sample;
  signal analyzing means responsive to said radiation detector for quantitatively analyzing radiation emitted by said radiation-emitting sample, said signal analyzing means including means for storing a value related to a pre-selected radiation emission characteristic of a known radiation-emitting sample positioned in said sample receiving zone in an essentially fixed sample-detector spatial relationship, and means responsive to said stored value for analyzing radiation emissions from a different radiation-emitting sample placed in said sample receiving zone in said essentially fixed sample-detector spatial relationship; and
  means for displaying a radiation emission characteristic for said different radiation-emitting sample.

30. The portable, bench top radiation detector for quantitative analysis of radiation-emitting samples of claim 29, wherein said radiation detector is a solid state diode.

31. The portable, bench top radiation detector for quantitative analysis of radiation-emitting samples of claim 29, wherein said apparatus includes connection means providing communication with at least one expansion module.

32. The portable, bench top radiation detector for quantitative analysis of radiation-emitting samples of claim 29, wherein said means for displaying is an alphanumeric liquid crystal display.

33. The portable, bench top radiation detector for quantitative analysis of radiation-emitting samples of claim 32, wherein said signal analyzing means includes a data input keyboard.

34. The portable, bench top radiation detector for quantitative analysis of radiation-emitting samples of claim 33, wherein said stored value is a calibration factor C relating a known radiation emission characteristic expressed in disintegrations per minute (DPM) to a detected radiation emission characteristic expressed in counts per minute (CPM) for said known radiation-emitting sample in accordance with the expression:

$$DPM = C \times CPM.$$

35. A portable, bench top radiation detection apparatus for quantitative analysis of radioactive samples comprising:
  a sample holder having an interior, generally cylindrical sample receiving zone for receiving a a single radiation-emitting sample which is not specially processed for use with said radiation detection apparatus;
  a generally planar radiation detector positioned adjacent said sample holder for detecting radiation emitted by said radiation-emitting sample;
  signal analyzing means responsive to said radiation detector for quantitatively analyzing radiation emitted by said radiation-emitting sample, said signal analyzing means including means for storing a value related to a pre-selected radiation emission characteristic of a known radiation-emitting sample positioned in said sample receiving zone, and means responsive to said stored value for analyzing radiation emissions from a different sample placed in said sample receiving zone; and
  means for displaying a radiation emission characteristic for said different radiation-emitting sample.

36. The portable, bench top radiation detector for quantitative analysis of radiation-emitting samples of claim 35, wherein said radiation detector is a solid state diode.

37. The portable, bench top radiation detector for quantitative analysis of radiation-emitting samples of claim 36, wherein said sample container cooperates with said sample receiving zone to provide an essentially fixed sample-detector spatial relationship.

38. The portable, bench top radiation detector for quantitative analysis of radiation-emitting samples of claim 37, wherein said means for displaying is a digital display means.

39. The portable, bench top radiation detector for quantitative analysis of radiation-emitting samples of claim 38, wherein said signal analyzing means includes a data input keyboard.

40. The portable, bench top radiation detector for quantitative analysis of radiation-emitting samples of claim 37, wherein said pre-selected radiation emission characteristic represents a calibration factor C relating a known radiation emission characteristic measured in disintegrations per minute (DPM) to a detected radiation emission characteristic expressed in counts per minute (CPM) for said known radiation emitting sample in accordance with the expression:

$$DPM = C \times CPM.$$

41. A method for quantitatively analyzing radiation-emitting samples in a portable, bench top radiation detection apparatus comprising the steps of:
  inserting a first container containing a known radiation-emitting sample into a sample receiving zone of a radiation detection apparatus;
  detecting radiation emitted by said known radiation-emitting sample into said sample receiving zone with a generally planar detector and generating a signal responsive to said detected radiation;
  quantitatively analyzing said detected radiation with respect to a pre-selected radiation emission characteristic stored in a memory means;
  removing said first container and inserting into said sample receiving zone a second container containing a second radiation-emitting sample, which second sample is not specially processed for use with said method;
  detecting radiation emitted by said second radiation-emitting sample into said sample receiving zone and generating a second signal responsive to said detected radiation;
  quantitatively analyzing said radiation emitted by said second radiation-emitting sample with respect to said preselected radiation emission characteristic; and
  displaying a radiation emission characteristic for said second sample.

42. The method for quantitatively analyzing radiation-emitting samples in a portable, bench top radiation detection apparatus of claim 41, wherein each of said first and second containers is positioned relative to said planar detector of radiation so as to obtain an essentially fixed sample-detector spatial relationship.

43. The method for quantitatively analyzing radiation-emitting samples in a portable, bench top radiation detection apparatus of claim 41, wherein said detected radiation comprises high energy beta and gamma radiation.

44. A method for quantitatively analyzing radiation-emitting samples in a portable, bench top radiation detection apparatus of claim 41, wherein said radiation detector is a planar solid state diode detector.

45. The method for quantitatively analyzing radiation-emitting samples in a portable, bench top radiation detection apparatus of claim 44, wherein said preselected radiation emission characteristic is communicated to said memory means by a data input keyboard.

46. The method for quantitatively analyzing radiation-emitting samples in a portable, bench top radiation detection apparatus of claim 41, wherein one of said at least one preselected radiation emission characteristics is a calibration constant C relating a known radiation emission characteristic expressed in disintegrations per minute (DPM) to a detected radiation emission characteristic expressed in counts per minute (CPM) for said known sample in accordance with the expression $$DPM = C \times CPM.$$

* * * * *